US012675567B2

(12) United States Patent

Tonami et al.

(10) Patent No.: US 12,675,567 B2

(45) Date of Patent: Jul. 7, 2026

(54) EMBEDDED SYSTEM STARTUP METHOD, STARTUP PROGRAM, AND EMBEDDED SYSTEM

(71) Applicant: JVCKENWOOD Corporation, Yokohama (JP)

(72) Inventors: Junichiro Tonami, Yokohama (JP); Takeshi Asahara, Yokohama (JP); Takashi Kato, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 41 days.

(21) Appl. No.: 18/776,923

(22) Filed: Jul. 18, 2024

(65) Prior Publication Data

US 2024/0370553 A1      Nov. 7, 2024

Related U.S. Application Data

(63) Continuation of application No. PCT/JP2023/001822, filed on Jan. 23, 2023.

(30) Foreign Application Priority Data

Jan. 25, 2022    (JP) ................................. 2022-009492
Jan. 25, 2022    (JP) ................................. 2022-009493

(51) Int. Cl.
*G06F 21/00*          (2013.01)
*G06F 21/53*          (2013.01)

(52) U.S. Cl.
CPC ........ *G06F 21/53* (2013.01); *G06F 2221/033* (2013.01)

(58) Field of Classification Search
CPC .. G06F 21/53; G06F 2221/033; G06F 21/575; G06F 9/445; G06F 21/57
See application file for complete search history.

(56) References Cited

U.S. PATENT DOCUMENTS

| | | | | | |
|---|---|---|---|---|---|
| 2018/0241945 | A1* | 8/2018 | Mimura | ................ | G06F 1/3209 |
| 2018/0349567 | A1* | 12/2018 | Kim | ......................... | G06F 40/10 |
| 2019/0121984 | A1* | 4/2019 | Rhee | ..................... | H04L 9/0877 |
| 2021/0133326 | A1* | 5/2021 | Wu | ....................... | G06F 21/577 |
| 2021/0192014 | A1 | 6/2021 | Yamaguchi et al. | | |

(Continued)

FOREIGN PATENT DOCUMENTS

| | | | | | |
|---|---|---|---|---|---|
| JP | 2009187134 | * | 8/2009 | .............. | G06F 1/00 |
| JP | 2009187134 | A | 8/2009 | | |
| JP | 2011145933 | A | 7/2011 | | |

(Continued)

*Primary Examiner* — Ghazal B Shehni

(74) *Attorney, Agent, or Firm* — PROCOPIO, CORY, HARGREAVES & SAVITCH LLP

(57) ABSTRACT

To prevent delay in startup time while ensuring program integrity at startup of an embedded system. In a startup method for an embedded system according to the present disclosure, a processor, which is provided in the embedded system and includes a main memory unit, and a nonvolatile storage unit storing a snapshot image based on a state of the main memory unit during execution of at least a first program, performs falsification verification for the snapshot image at startup, and, if being normal is confirmed by the falsification verification, executes the first program restored on the main memory unit from the snapshot image.

5 Claims, 11 Drawing Sheets

(56) References Cited

U.S. PATENT DOCUMENTS

2021/0350027 A1    11/2021  Sakurada

FOREIGN PATENT DOCUMENTS

| | | | | |
|---|---|---|---|---|
| JP | 2013222372 | * | 10/2013 | ............. G06F 9/445 |
| JP | 2013222372 | A | 10/2013 | |
| JP | 2021-177593 | A | 11/2021 | |
| WO | 2020075303 | A1 | 4/2020 | |

* cited by examiner

EMBEDDED SYSTEM STARTUP METHOD, STARTUP PROGRAM, AND EMBEDDED SYSTEM

CROSS REFERENCE TO RELATED APPLICATION

This application is a bypass continuation application of PCT/JP2023/001822 filed on Jan. 23, 2023, which is based upon and claims the benefit of priority from Japanese patent application 2022-009492 filed on Jan. 25, 2022 and Japanese Patent Application No. 2022-009493 filed on Jan. 25, 2022, the disclosure of which is incorporated herein in its entirety by reference.

BACKGROUND

The present disclosure relates to an embedded system startup method, a startup program, and an embedded system.

An electronic apparatus or the like in which an electronic substrate mounted with a processor, a memory, a flash memory, and the like are incorporated is also called an embedded system. In the embedded system, in order to start program such as an OS (operating system) at a high speed, a RAM (random access memory) image or the like that includes an execution state of the programs is stored in the flash memory or the like during execution of the program in advance, and the RAM image is loaded to a RAM from the flash memory or the like at the next startup.

Patent Literature 1 (Japanese Unexamined Patent Application Publication No. 2011-145933) discloses a technique of preloading a part of a RAM image onto a RAM at startup and sequentially reading pages where page faults have occurred during execution of a program, into the RAM. The RAM image is also called a snapshot image.

SUMMARY

Recently, high security has been required of an embedded system, and verification of integrity for a target program is required before execution of the program. Therefore, when an embedded system adopts a fast startup method of reading a snapshot image at startup, it is necessary to carry out security inspection such as falsification checking for the snapshot image. When the security inspection is simply carried out for the snapshot image at the startup of the embedded system, however, processing of reading from a flash memory or the like increases, and a problem occurs that more startup time is required. The technique according to Patent Literature 1 described above does not deal with the falsification checking of a snapshot image.

Generally, a snapshot image is such that it is obtained by storing a state of a main memory unit during execution of a program, in a nonvolatile storage unit as data. Therefore, as for a program that is not executed at the time of generating the snapshot image, it is not included in the snapshot image and is not to be subjected to falsification verification at startup of an embedded system. Therefore, at the time of executing the unexecuted program, falsification verification of the program therefor is additionally required, which requires much processing time and causes falsification verification to be performed in an inefficient manner.

A first aspect of the present disclosure provides an embedded system startup method, wherein a processor, which is provided in an embedded system and comprises a main storage unit, and a nonvolatile storage unit storing a snapshot image based on a state of the main memory unit during execution of at least a first program, performs falsification verification for the snapshot image at startup, and, if being normal is confirmed by the falsification verification, executes the first program restored on the main storage unit from the snapshot image.

A second aspect of the present disclosure provides an embedded system startup program, the program causing an embedded system, which comprises a main storage unit, and a nonvolatile storage unit storing a snapshot image based on a state of the main memory unit during execution of at least a part of a program, to execute: a process for performing falsification verification for the snapshot image at startup, and a process for, if being normal is confirmed by the falsification verification, executing the program restored on the main storage unit from the snapshot image.

A third aspect of the present disclosure provides an embedded system, the embedded system including: a main memory unit; and a nonvolatile storage unit storing a snapshot image based on a state of the main memory unit during execution of at least a part of a program; the embedded system performing falsification verification for the snapshot image at startup; and the embedded system executing, if being normal is confirmed by the falsification verification, the program restored on the main storage unit from the snapshot image.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Figure 1:
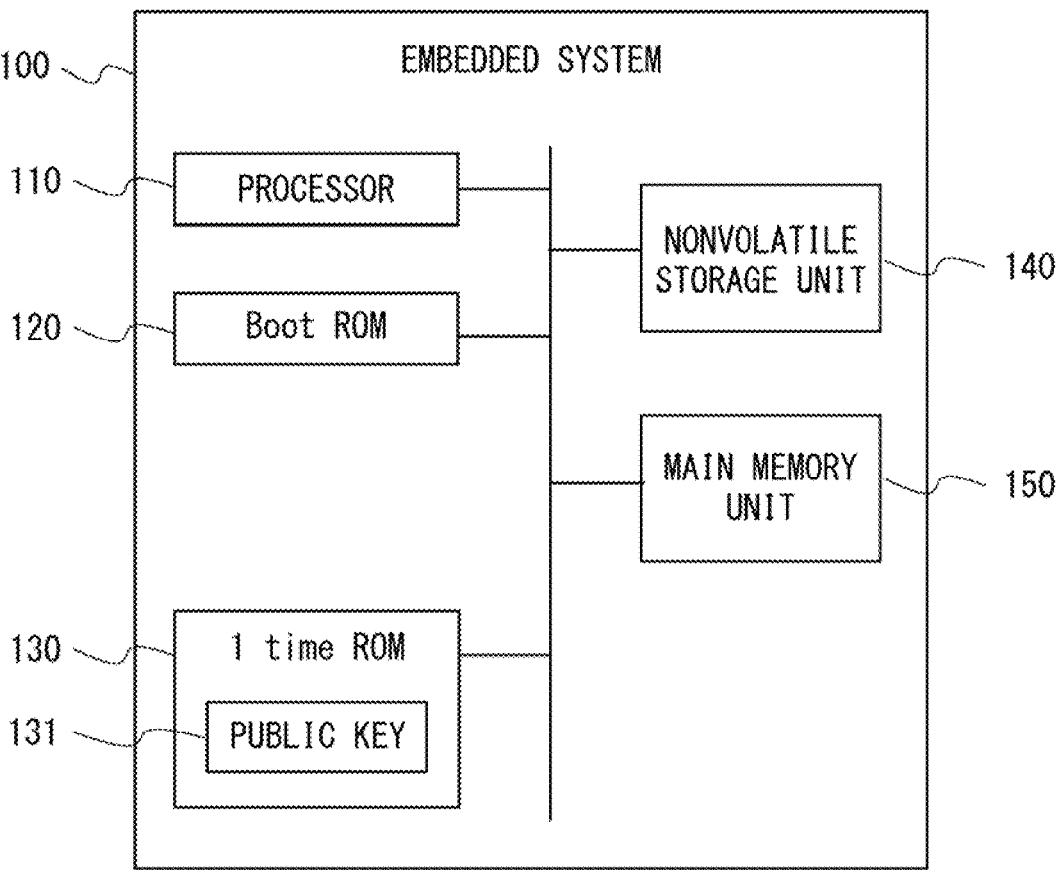
FIG. 1 is a block diagram showing a configuration of an embedded system according to a first embodiment.

Hereinafter, specific embodiments of the present disclosure will be described in detail with reference to drawings. In the drawings, the same components are given the same reference sign, and duplicate description will be omitted as necessary in order to clarify the description.

First Embodiment

FIG. 1 is a block diagram showing a configuration of an embedded system 100 according to a first embodiment. The embedded system 100 is a computer system for realizing particular functions. The embedded system 100 is, for example, an electronic apparatus equipped with a micro-computer or the like which is mounted on a home appliance, an industrial apparatus, a mobile body, or the like. As the electronic apparatus, for example, a car navigation appara-tus, a television receiver, a hard disk recorder, and the like are exemplified, but the electronic apparatus is not limited thereto. The embedded system 100 is provided with at least a processor 110, a boot ROM (read-only memory) 120, a 1-time ROM 130, a nonvolatile storage unit 140, and a main memory unit 150.

The processor 110 is a control device that controls each unit of the embedded system 100. The processor 110 is, for example, a CPU (central processing unit) and may be a processor mounted with an MMU (memory management unit). Further, the processor 110 may be an arbitrary com-bination of a plurality of CPUs, an FPGA (field program-mable gate array), an ASIC (application specific integrated circuit), and the like to control each unit in cooperation.

The boot ROM 120 is a storage device that stores an initial processing program, for example, a system BIOS (basic input/output system) read by the processor 110 when the embedded system 100 is powered on. The initial pro-cessing program is a computer program implemented with a process for verifying a first startup program to be described later and, if it is confirmed by the verification that the first startup program is normal, loading and starting up the first startup program. The boot ROM 120 may be configured by dividing an area on the nonvolatile storage unit 140 to be described later.

The 1-time ROM 130 is, for example, a ROM that can be written to only once but is not limited thereto. The 1-time ROM 130 stores encryption key information such as a public key 131, apparatus-specific ID information, and the like. The public key 131 is a public key used by the above-described initial processing program at the time of verification. It is preferable that the boot ROM 120 and the 1-time ROM 130 are configured as secure areas, and they may be configured on chip together with the processor 110.

The nonvolatile storage unit 140 is a nonvolatile storage device in which various kinds of programs to be executed in the embedded system 100 and data are stored. The nonvola-tile storage unit 140 may be a semiconductor memory such as a flash memory, a hard disk, or the like. As the nonvolatile storage unit 140, for example, an eMMC (embedded multi media card) as an example of a flash memory and a flash ROM and the like are exemplified, but the nonvolatile storage unit 140 is not limited thereto. The nonvolatile storage unit 140 is also called an external storage device or an auxiliary storage device.

Figure 2:
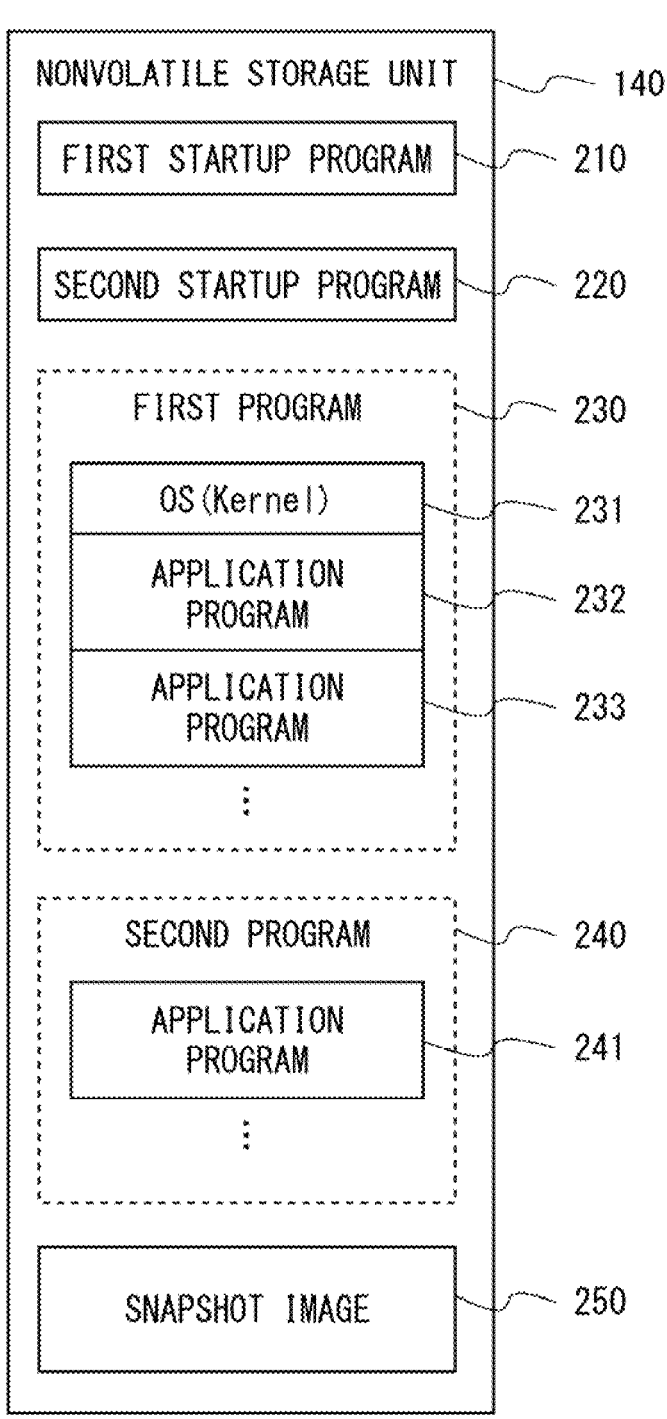
FIG. 2 is a diagram showing an example of data stored in a nonvolatile storage unit according to the first embodiment.

FIG. 2 is a diagram showing an example of data stored in the nonvolatile storage unit 140 according to the first embodiment. The nonvolatile storage unit 140 stores a first startup program 210, a second startup program 220, a first program 230, a second program 240, and a snapshot image 250.

The first startup program 210 is a computer program that performs verification of the second startup program 220 and, if it is confirmed by the verification that the second startup program 220 is normal, performs loading and startup of the second startup program 220. The first startup program 210 is a program implemented with a so-called boot-loader pro-cess. Further, the first startup program 210 may be encrypted and signed with a secret key (not shown). Here, the secret key is a key paired with the public key 131 described above. It is assumed that the first startup program 210 is imple-mented with complicated processes in comparison with the initial processing program described above. Specifically, the first startup program 210 is implemented with a process for performing falsification verification for the second startup program 220 and the snapshot image 250. Further, the first startup program 210 is implemented with a process for instructing the second startup program 220 to transfer the snapshot image 250 to the main memory unit 150. Further, the first startup program 210 is implemented with a process for, if it is confirmed by the falsification verification that the snapshot image 250 is normal without falsification, giving an instruction to restore the snapshot image 250.

The second startup program 220 is a computer program implemented with complicated processes in comparison with the first startup program 210 described above. Specifi-cally, the second startup program 220 is implemented with a process for transferring the snapshot image 250 from the nonvolatile storage unit 140 to the main memory unit 150 in response to a transfer instruction from the first startup program 210. Especially, the second startup program 220 transfers the snapshot image 250 from the nonvolatile stor-age unit 140 to the main memory unit 150 in a state of compressed data in a predetermined format. That is, the second startup program 220 copies the snapshot image 250 from the nonvolatile storage unit 140 to the main memory unit 150. As for a data compression method, any of various kinds of publicly known formats can be adopted, and the format is not limited here. Further, the second startup program 220 is implemented with a process for restoring the snapshot image 250 in response to a restoration instruction from the first startup program 210. More specifically, the second startup program 220 decompresses the compressed data in the main memory unit 150 to restore the first program. Here, the process for restoring the snapshot image 250 is, for example, a process for returning a state of hardware register settings and memory of the processor 110 to a state at the time of execution when the snapshot image 250 was created, that is, to an executable state again. Further, the process for restoring the snapshot image 250 may be a process for appropriately decompressing a process required for operation. By creating the snapshot image 250 in a form of being capable of performing decompression and restora-tion of the compressed data at once as above, it is possible to efficiently complete the process from startup to snapshot restoration. Then, the second startup program 220 causes the restored first program 230 to transition to an executable state.

The first program 230 includes one or more computer programs. Here, it is assumed that the first program 230 includes an OS (operating system) 231, an application program 232, an application program 233, . . . . The OS 231 is basic software and includes a kernel. Each of the appli-cation programs 232, 233, . . . is application software that realizes a function to be provided for a user in an electronic apparatus.

The second program 240 includes one or more computer programs other than the OS. Here, it is assumed that the second program 240 includes application programs 241, . .

. . The application programs 241, . . . are pieces of application software different from the application programs 232, 233, . . . described above.

The snapshot image 250 is data in which a state of the main memory unit 150 during execution of the first program 230 is outputted. The snapshot image 250 includes a state in which the OS 231 and the application programs 232, 233, . . . are loaded to the main memory unit 150. Further, the snapshot image 250 includes register content, program counters, stack pointers, and the like at the time of execution of the OS 231 and the application programs 232, 233, . . . . Further, the snapshot image 250 may be compressed data that is compressed in a predetermined format. When the embedded system 100 is operated, for example, in a manner that the system is always started up with the same snapshot image 250 without the necessity of updating the snapshot image 250, the configurations of the first program 230 and the second program 240 indicated by broken lines in FIG. 2 may not be required.

Returning to FIG. 1, the description will be continued.

The main memory unit 150 is a storage area for temporarily holding information when the processor 110 is operating. The main memory unit 150 is also called a volatile storage unit, a primary storage unit, or simply "a memory". The main memory unit 150 is a high-speed volatile storage device such as a RAM. Specifically, the main memory unit 150 may be a DRAM (dynamic RAM), an SRAM (static RAM), or the like. For example, the main memory unit 150 stores the above-described initial processing program, the first startup program 210, the second startup program 220, the first program 230, the second program 240, the snapshot image 250, and the like.

It is assumed that the embedded system 100 is provided with components of a general microcomputer as other components not shown.

Figure 3:
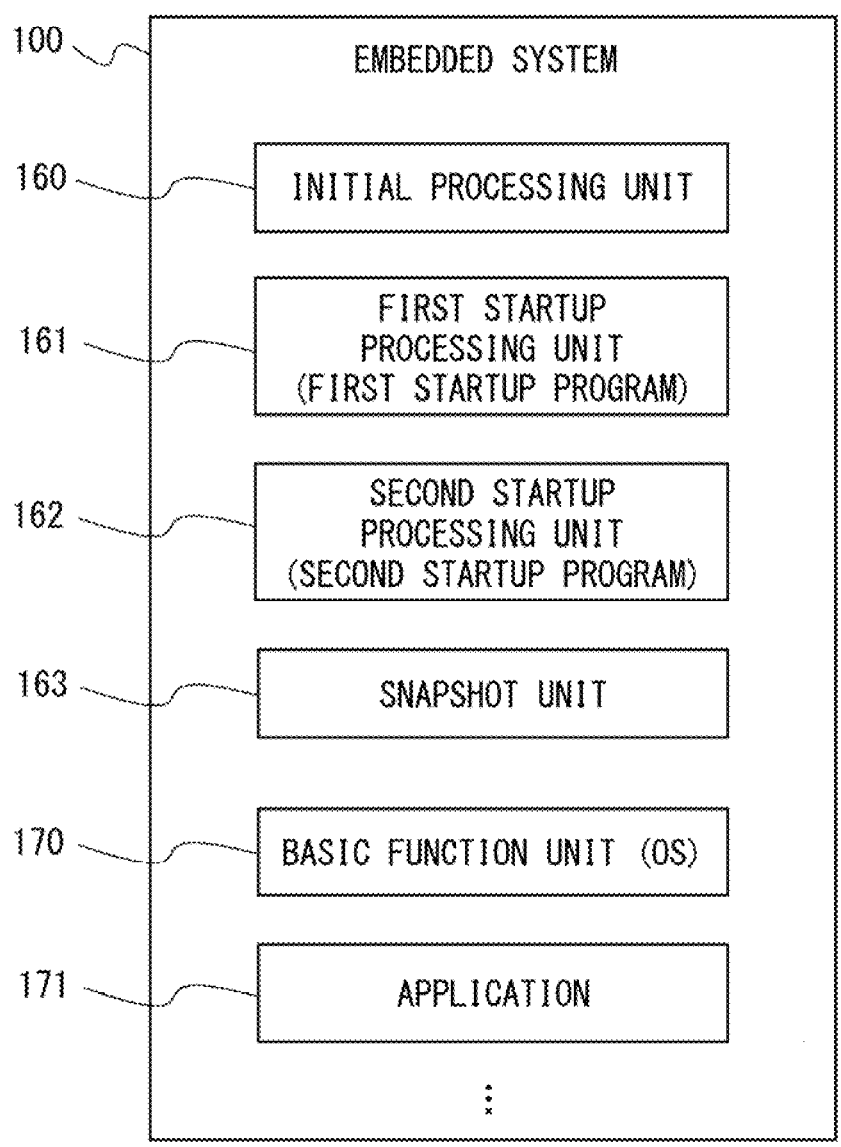
FIG. 3 is a block diagram showing a functional configuration of the embedded system according to the first embodiment.

FIG. 3 is a block diagram showing a functional configuration of the embedded system 100 according to the first embodiment. FIG. 3 shows functional blocks in the case of the processor 110 of the embedded system 100 causing various kinds of programs to be read into the main memory unit 150 and executing the various kinds of programs. Specifically, the processor 110 functions as an initial processing unit 160 by loading the initial processing program from the boot ROM 120 to the main memory unit 150 and executing the initial processing program. The initial processing unit 160 is a functional block that realizes an initial process at startup of the embedded system 100, which is implemented in the above-described initial processing program.

Further, the processor 110 functions as a first startup processing unit 161 by loading the first startup program 210 from the nonvolatile storage unit 140 to the main memory unit 150 and executing the first startup program 210. The first startup processing unit 161 is a functional block that realizes a first startup process for the embedded system 100, which is implemented in the first startup program 210.

Further, the processor 110 functions as a second startup processing unit 162 by loading the second startup program 220 from the nonvolatile storage unit 140 to the main memory unit 150 and executing the second startup program 220. The second startup processing unit 162 is a functional block that realizes a second startup process for the embedded system 100, which is implemented in the second startup program 220.

Further, the processor 110 functions as functional blocks that realize main processes of the embedded system 100, such as a snapshot unit 163, a basic function unit 170, and an application 171 by loading the first program 230 from the nonvolatile storage unit 140 to the main memory unit 150 and executing the first startup program 210. The snapshot unit 163 generates the snapshot image 250 from a state of the main memory unit 150 during execution of a program and stores the snapshot image 250 into the nonvolatile storage unit 140 at predetermined timings, for example, periodically or at externally specified timings. The basic function unit 170 is a functional block that realizes processes implemented in the OS 231. The snapshot unit 163 may also be realized by a process implemented in the OS 231. The application 171 is a functional block that realizes processes implemented in the application programs 232, 233, . . . . The processor 110 may realize processes of predetermined applications by loading the second program 240 from the nonvolatile storage unit 140 to the main memory unit 150 and executing the second program 240.

Figure 4:
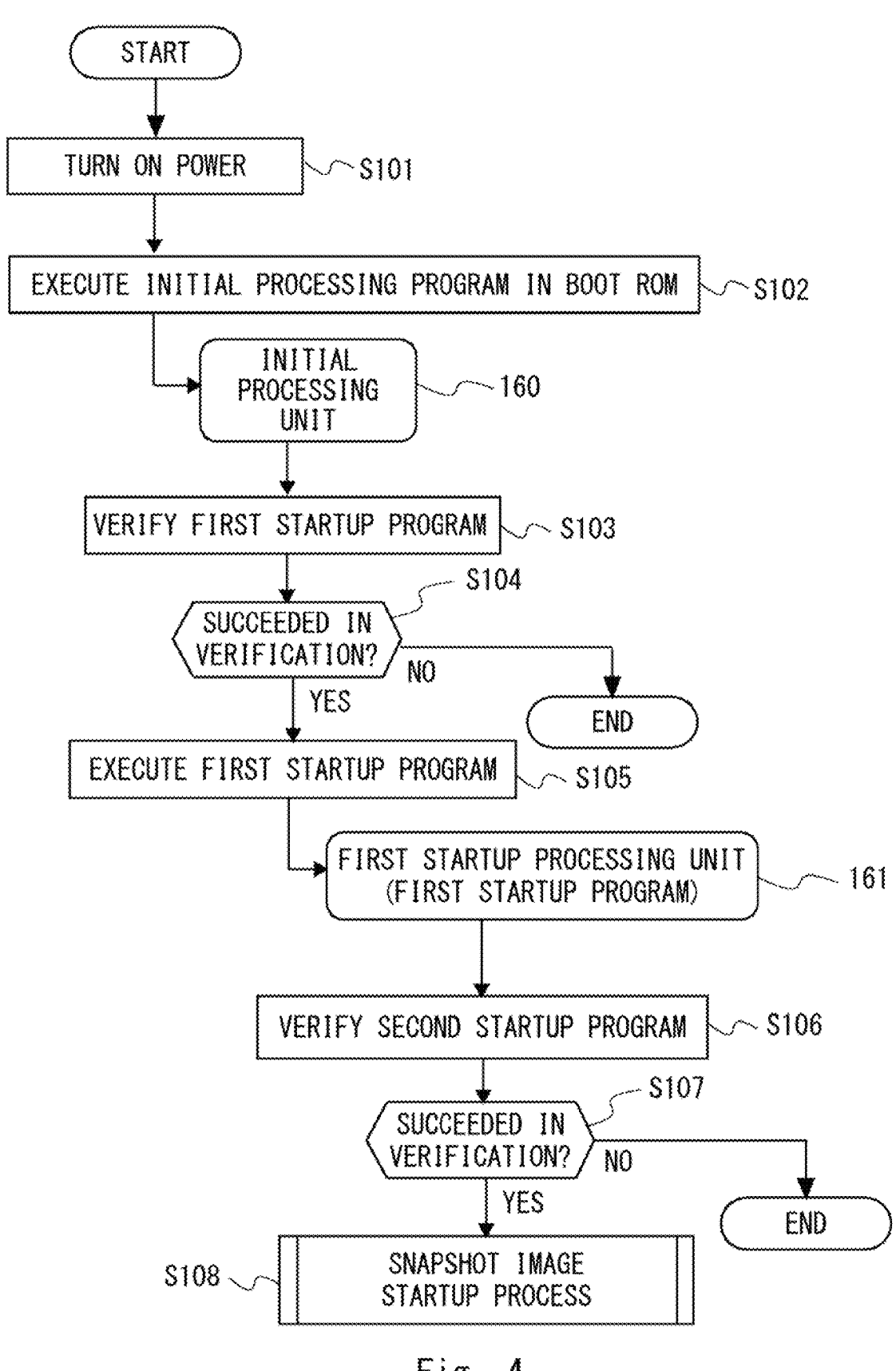
FIG. 4 is a flowchart showing a flow of a startup process for the embedded system according to the first embodiment.

FIG. 4 is a flowchart showing a flow of a startup process for the embedded system 100 according to the first embodiment. It is assumed that the embedded system 100 had already stored a state of the main memory unit 150 during execution of various kinds of programs that were executing after the last startup, in the nonvolatile storage unit 140 as the snapshot image 250.

First, the embedded system 100 is powered on. That is, the embedded system 100 accepts a notification that power has been turned on (S101). Thereby, the embedded system 100 starts the startup process. The processor 110 of the embedded system 100 reads the above-described initial processing program from the boot ROM 120 and executes the initial processing program (S102). Thereby, the processor 110 functions as the initial processing unit 160.

Next, the initial processing unit 160 verifies the first startup program 210 (S103). Specifically, the initial processing unit 160 loads the first startup program 210 from the nonvolatile storage unit 140 to the main memory unit 150. Then, the initial processing unit 160 verifies encryption and a signature by an asymmetric key for the first startup program 210 on the main memory unit 150, using the public key 131 in the 1-time ROM 130. As the verification process by the initial processing unit 160, a publicly known technique can be used, and other verification processes may be used.

Then, the initial processing unit 160 judges whether having succeeded in the verification of the first startup program 210 or not (S104). If the verification fails (S104: NO), the embedded system 100 shuts down without starting up. At this time, the embedded system 100 may output a notification of having failed in the verification.

Here, it is assumed that the first startup program 210 has been encrypted and signed with the secret key paired with the public key 131 in advance. Therefore, the initial processing unit 160 performs decryption and signature verification of the first startup program 210 with the public key 131 and succeeds in the verification (S104: YES). Then, the initial processing unit 160 executes the first startup program 210 (S105). Thereby, the processor 110 functions as the first startup processing unit 161.

Then, the first startup processing unit 161 verifies the second startup program 220 (S106). Specifically, the first startup processing unit 161 loads the second startup program 220 from the nonvolatile storage unit 140 to the main memory unit 150. Then, the first startup processing unit 161 calculates a hash value from the second startup program 220 on the main memory unit 150, and performs verification by comparing a hash value for verification (not shown) held in advance with the calculated hash value.

Then, the first startup processing unit 161 judges whether having succeeded in the verification of the second startup program 220 or not (S107). For example, if compared hash values are different from each other, it is judged that the verification has failed. If the verification has failed (S107: NO), the embedded system 100 shuts down without starting up. At this time, the embedded system 100 may be rebooted by watchdog. Or alternatively, the embedded system 100 may output a notification of having failed in the verification.

On the other hand, if the compared hash values correspond to each other, the verification has succeeded (S107: YES), and the first startup processing unit 161 performs a snapshot image startup process (S108). First, the first startup processing unit 161 executes the second startup program 220. Thereby, the processor 110 also functions as the second startup processing unit 162.

Figure 5:
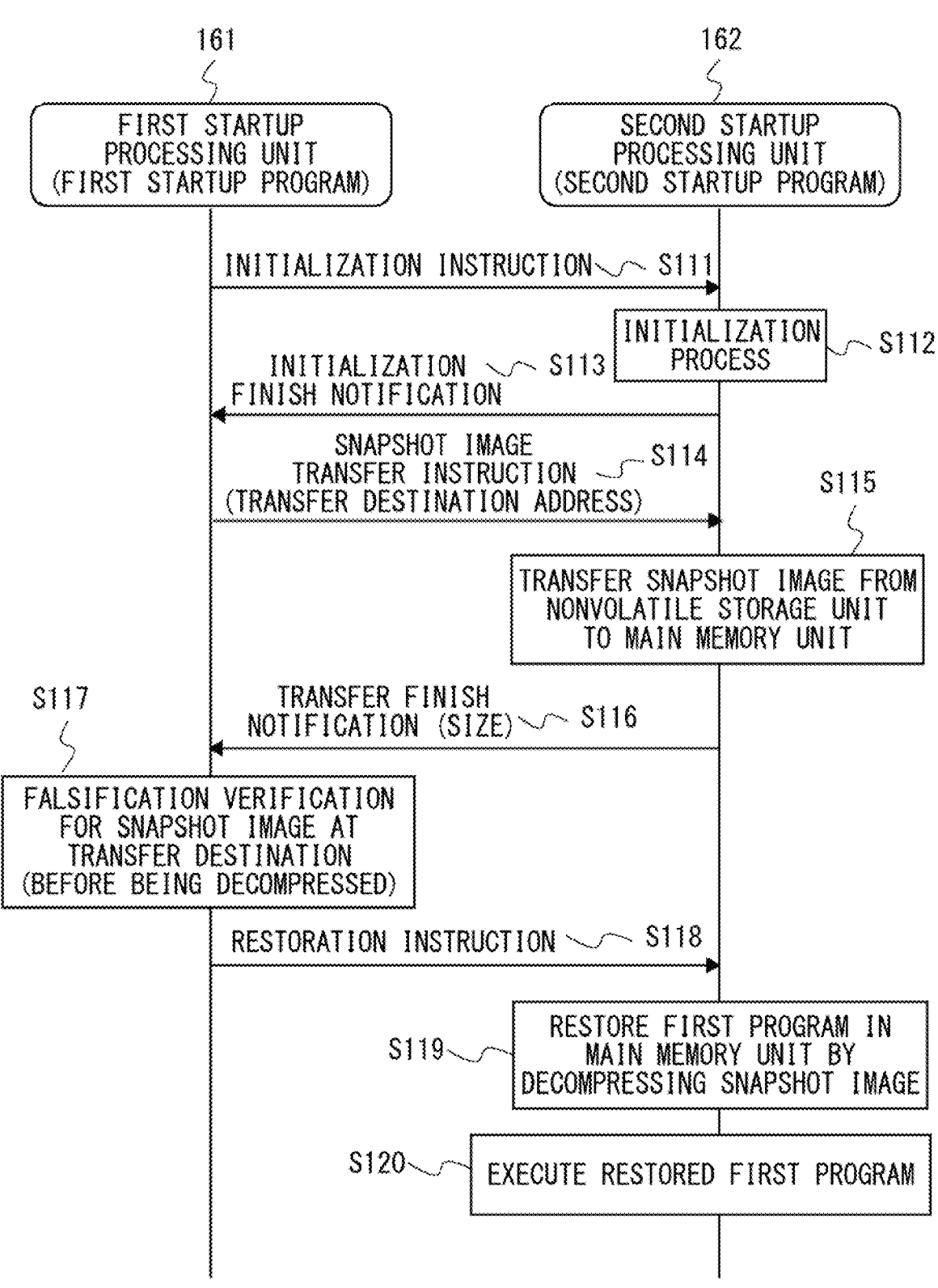
FIG. 5 is a sequence diagram showing a flow of a snapshot image startup process according to the first embodiment.
Figure 6:
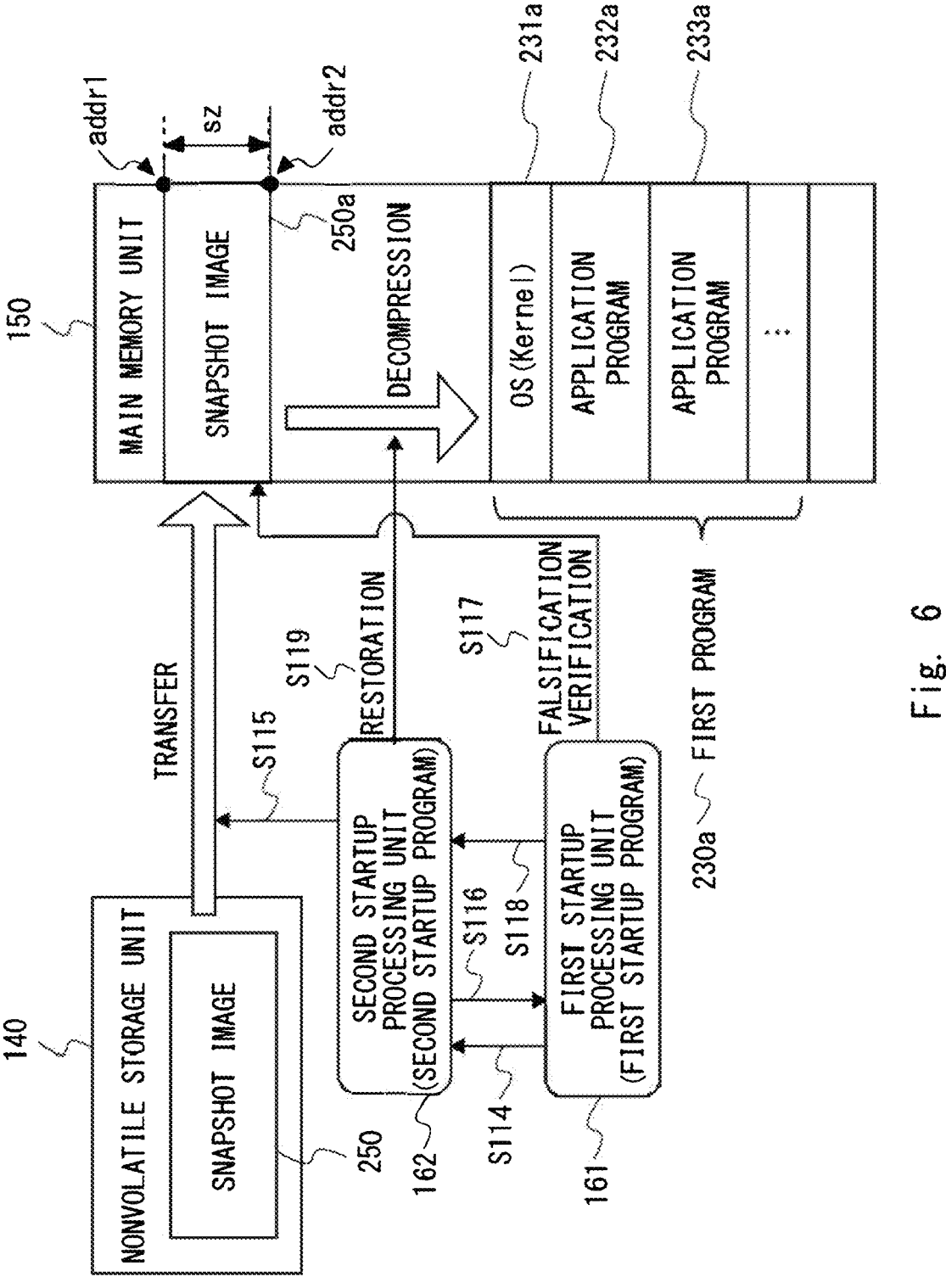
FIG. 6 is a diagram for illustrating a concept of the snapshot image startup process according to the first embodiment.

FIG. 5 is a sequence diagram showing a flow of the snapshot image startup process according to the first embodiment. Further, FIG. 6 is a diagram for illustrating a concept of the snapshot image startup process according to the first embodiment. The description below will be made, appropriately with reference to FIGS. 5 and 6.

First, the first startup processing unit 161 instructs the second startup processing unit 162 to perform initialization (S111). In response thereto, the second startup processing unit 162 performs an initialization process for the second startup program 220 (S112). Then, after initialization ends, the second startup processing unit 162 makes an initialization finish notification to the first startup processing unit 161 (S113).

Then, the first startup processing unit 161 instructs the second startup processing unit 162 to transfer the snapshot image 250 (S114). At this time, the first startup processing unit 161 specifies a transfer destination address of the snapshot image 250 in the main memory unit 150, that is, a start address and includes the address into the transfer instruction. For example, the transfer destination address is an address addr1 in FIG. 6.

In response thereto, the second startup processing unit 162 transfers the snapshot image 250 from the nonvolatile storage unit 140 to the main memory unit 150 (S115). At this time, the second startup processing unit 162 reads the snapshot image 250 from the nonvolatile storage unit 140, transfers the address addr1 in the main memory unit 150 as the start address, and stores a snapshot image 250a. In the startup process, simple image validity verification may be performed for the snapshot image 250 in the nonvolatile storage unit 140 before step S115. For example, the first startup processing unit 161 or the second startup processing unit 162 may perform sum check and the like for the header or file of the snapshot image 250 and perform step S115 if there is no problem. It is assumed that, at this point of time, the snapshot image 250a in the main memory unit 150 is compressed data. That is, though the snapshot image 250a has been already transferred to the main memory unit 150, each program in the inside are not executed.

After step S115, the second startup processing unit 162 acquires a data size sz from an address addr2 corresponding to the end of the snapshot image 250a transferred to the main memory unit 150, and makes a transfer finish notification including the data size sz, to the first startup processing unit 161 (S116).

In response thereto, the first startup processing unit 161 performs falsification verification for the snapshot image 250a at the transfer destination before being decompressed (S117). That is, the first startup processing unit 161 performs falsification verification for the snapshot image 250a in the main memory unit 150. Specifically, the first startup processing unit 161 calculates the address addr2, which is an end address, by adding the data size sz included in the transfer finish notification to the address addr1 specified at step S114. Then, the first startup processing unit 161 performs falsification verification for a range from the address addr1 to the address addr2 in the main memory unit 150.

For example, the first startup processing unit 161 calculates a hash value for the snapshot image 250a and compares a hash value for verification held in advance (not shown) with the calculated hash value. That is, the first startup processing unit 161 judges whether having succeeded in the verification or not. If the compared hash values correspond to each other, it is judged that the falsification verification has succeeded, that is, it is confirmed by the falsification verification that the snapshot image 250a is normal. If the falsification verification has failed, the embedded system 100 shuts down without starting up (not shown). At this time, the embedded system 100 may output a notification of having failed in the verification.

If it is confirmed by the falsification verification that the snapshot image 250a is normal, the first startup processing unit 161 instructs the second startup processing unit 162 to restore the snapshot image 250a (S118). In response thereto, the second startup processing unit 162 restores a first program 230a in the main memory unit 150 by decompressing the snapshot image 250a (S119). For example, as shown in FIG. 6, the first program 230a that includes an OS 231a, application programs 232a, 233a, . . . , and the like is transferred into the main memory unit 150 as a result. At the same time, the second startup processing unit 162 makes settings for register content, program counters, stack points, and the like at the time of execution of the OS 231a, the application programs 232a, 233a, . . . , and the like included in the snapshot image 250a. The second startup processing unit 162 may release the snapshot image 250a from the main memory unit 150 after the restoration.

After that, the second startup processing unit 162 executes the restored first program 230a (S120). Thereby, in the embedded system 100, execution of the programs is resumed in a state at the time of acquisition of the snapshot image 250. That is, the embedded system 100 starts up. Since this startup process uses the snapshot image 250a, startup can be performed at a high speed in comparison with the case of loading the first program 230 in the nonvolatile storage unit 140, and initializing and then executing each program.

Thus, the embedded system startup process according to the first embodiment is a process that supports so-called Secure Boot and expands Secure Boot. Therefore, the embedded system startup process according to the first embodiment realizes high-speed startup after performing integrity verification for target programs before executing a main program of an embedded system, in order to satisfy security requirements which have been increasingly demanded. Especially, in the first embodiment, the snapshot image 250 is transferred from the nonvolatile storage unit 140 to the main memory unit 150 for falsification verification, and, immediately after the falsification verification, the snapshot image 250a on the main memory unit 150 is decompressed and restored to resume execution of the programs. Therefore, the number of times of transferring a snapshot image from the nonvolatile storage unit 140 to the main memory unit 150 can be minimized. Therefore, both of high-speed startup of an embedded system and ensuring of integrity can be achieved.

Furthermore, since the first startup processing unit 161 performs falsification verification for the snapshot image 250*a* in a compressed state, it is possible to reduce verification target data in comparison with data after being decompressed and shorten falsification verification time. Further, in the case of performing falsification verification for the compressed data before being decompressed, it is possible to prevent an unexpected trouble accompanying the decompression process and execute the process in a safe state.

By steps S114 to S116, the first startup processing unit 161 can accurately grasp an actual address range of the snapshot image 250*a*, which has not been transferred by the first startup processing unit 161 itself, on the main memory unit 150. Therefore, the first startup processing unit 161 can perform falsification verification for an appropriate target.

Next, another example of the first embodiment will be described. A configuration of the embedded system 100 according to the present example is similar to that of FIG. 1 described above. The present example is different from the example described above in that the process for decompressing the snapshot image 250*a* is performed in parallel with at least a part of the process for transferring the snapshot image 250 from the nonvolatile storage unit 140 to the main memory unit 150.

Figure 7:
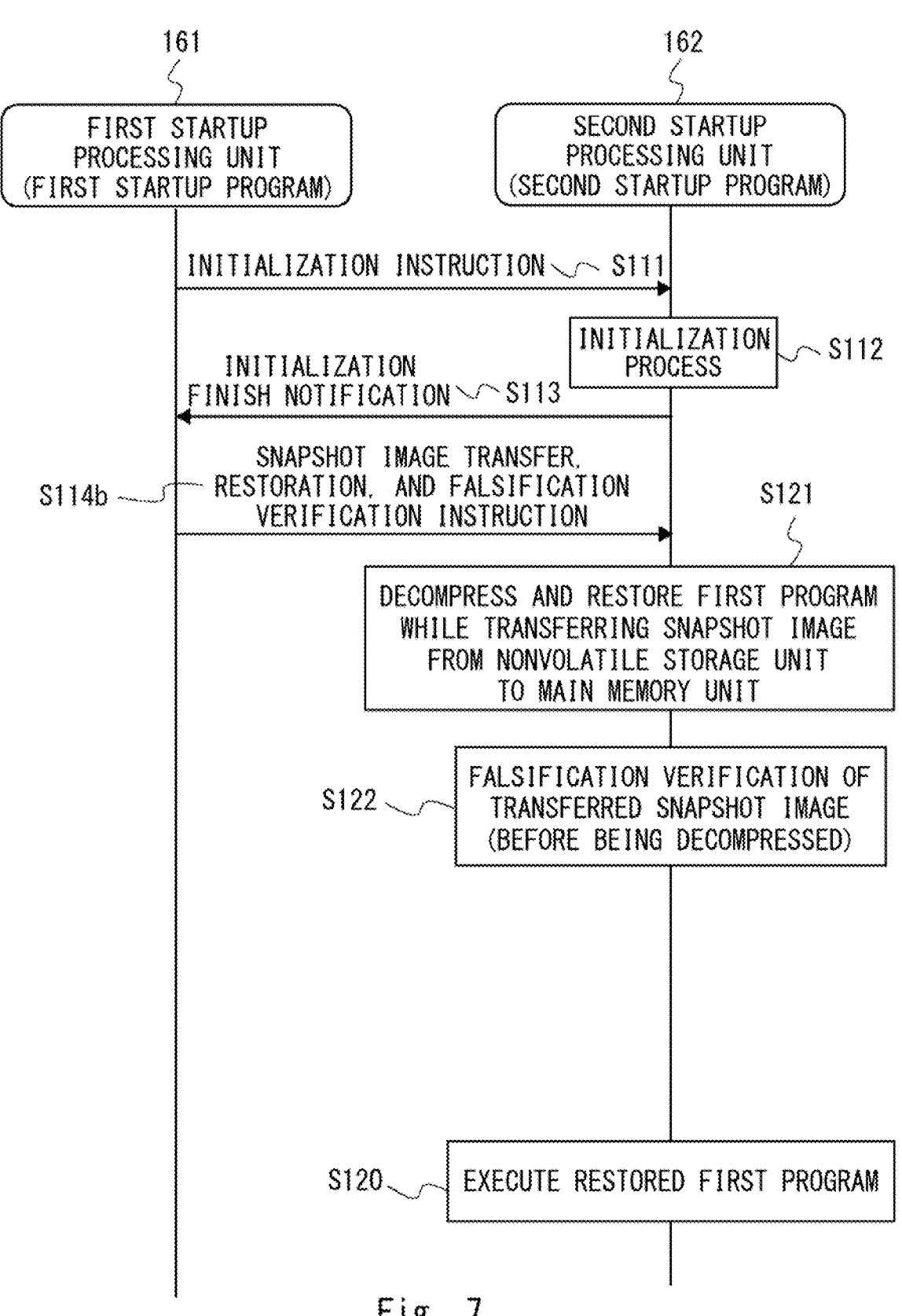
FIG. 7 is a sequence diagram showing a flow of a snapshot image startup process according to another example of the first embodiment.
Figure 8:
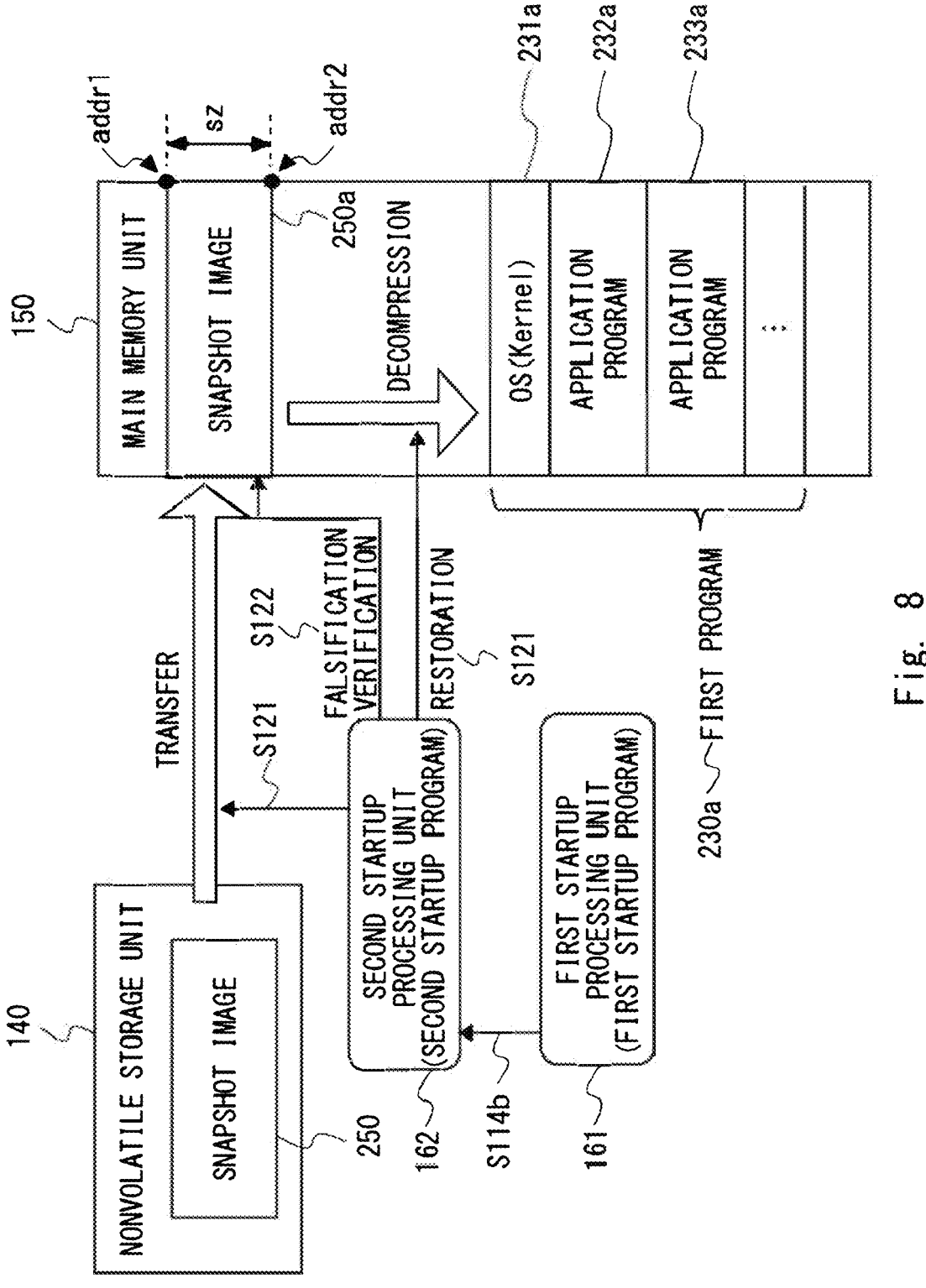
FIG. 8 is a diagram for illustrating a concept of the snapshot image startup process according to the other example of the first embodiment.

FIG. 7 is a sequence diagram showing a flow of a snapshot image startup process according to another example of the first embodiment. FIG. 8 is a diagram for illustrating a concept of the snapshot image startup process according to the other example of the first embodiment. The description below will be made, appropriately with reference to FIGS. 7 and 8. Similar components will be given the same or corresponding reference signs, and duplicate content will be appropriately omitted.

The first startup processing unit 161 instructs the second startup processing unit 162 to perform transfer, restoration, and falsification verification of the snapshot image 250 (S114*b*). In the present example, a description will be made on the assumption that the second startup processing unit 162 also performs falsification verification after transfer. Thereby, it is not necessary to specify a start address.

In response to the instruction at step S114*b*, the second startup processing unit 162 sequentially decompresses the snapshot image 250*a* in the main memory unit 150 to restore the first program 230*a* while transferring the snapshot image 250 from the nonvolatile storage unit 140 to the main memory unit 150 (S121). For example, while sequentially storing pieces of partial data of the snapshot image 250 transferred from the nonvolatile storage unit 140 into the main memory unit 150 as the snapshot image 250*a*, the second startup processing unit 162 sequentially decompresses the stored pieces of partial data. Therefore, at least before transfer of the snapshot image 250 is completed, the second startup processing unit 162 starts decompression of the pieces of partial data of the snapshot image 250*a* that have been already stored in the main memory unit 150 at that point of time. Thus, it is assumed that at least parts of the snapshot image transfer and decompression processes are performed in parallel. In other words, during a period from start of transfer of the snapshot image 250 from the nonvolatile storage unit 140 to the main memory unit 150 in the state of compressed data in the predetermined format until the completion of the transfer, the second startup processing unit 162 causes decompression of the compressed data to start on the main memory unit 150 to restore the first program 230*a*.

Then, the second startup processing unit 162 performs falsification verification for the snapshot image 250*a* transferred to the main memory unit 150 (S122). That is, the second startup processing unit 162 performs falsification verification for the compressed data after being transferred. At this time, the second startup processing unit 162 may be decompressing the snapshot image 250*a*, that is, restoring the first program 230*a* in parallel. Therefore, there may be a time zone during which the falsification verification process for the snapshot image 250*a* that has been transferred but is not decompressed and the process for decompression from the snapshot image 250*a* to the first program 230*a* (a restoration process) are executed in parallel.

If it is confirmed by the falsification verification of step S122 that the snapshot image 250*a* is normal, the second startup processing unit 162 executes the first program 230*a* that has been already restored (S120). Thereby, in the embedded system 100, execution of the programs is resumed in the state at the time of acquisition of the snapshot image 250. That is, the embedded system 100 starts up.

In a case where it is not confirmed by the falsification verification of step S122 that the snapshot image 250*a* is normal or in a case where an area error or the like occurs in the decompression process of step S121 or the like, the second startup processing unit 162 ends without startup (not shown). The second startup processing unit 162 may return the process to the first startup processing unit 161 and finish the startup process.

As described above, at step S121, the second startup processing unit 162 performs parts of the snapshot image transfer and decompression processes in parallel and performs decompression to the snapshot image 250*a* on the memory of the main memory unit 150 in advance. However, since execution is performed after the falsification verification of step S122, program integrity can be ensured. In the present example, since memory resources and the like including the cache of the processor 110 can be efficiently handled by performing the transfer and decompression processes in parallel, high-speed startup with further shortened processing time can be realized.

Second Embodiment

A second embodiment is a modification of the first embodiment described above. In the first embodiment described above, a falsification verification target is a snapshot image 250 of the first program 230 that is being executed. Therefore, the second program 240 that is not executed, that is, not loaded to the main memory unit 150 at the time of acquisition of the snapshot image 250 is not included in the snapshot image 250 and is not to be subjected to falsification verification. Therefore, it is necessary to additionally perform falsification verification for the second program 240. In comparison, in the second embodiment, by including the second program 240 that is not executed, into a snapshot image 250*b*, falsification checking at startup is performed for the first program 230 and the second program 240 together. Thereby, the efficiency of the falsification verification process can be improved. It is assumed that the size of the second program 240 is smaller than the available capacity of the main memory unit 150 when the first program 230 is being executed.

Figure 9:
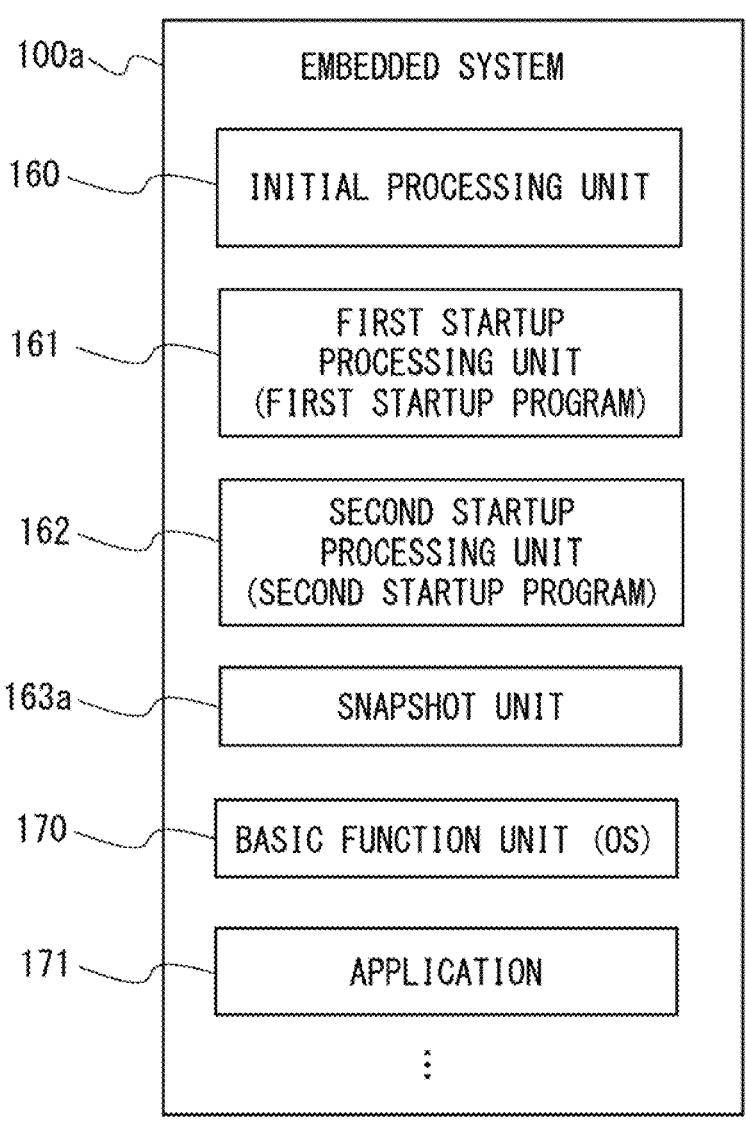
FIG. 9 is a block diagram showing a functional configuration of an embedded system according to a second embodiment.

FIG. 9 is a block diagram showing a functional configuration of an embedded system 100*a* according to the second embodiment. Since the physical configuration of the embedded system 100*a* according to the second embodiment is similar to that of FIG. 1 described above, duplicate content will be appropriately omitted. In the embedded system 100*a*, the snapshot unit 163 is changed to a snapshot unit 163*a* in comparison with FIG. 3 explained above. Further, it is assumed that the main memory unit 150 includes an execution area and an unexecution area. Here, the execution area is an area where the first program that is being executed by the processor 110 is stored. The unexecution area is an area where the second program that is not executed by the processor 110 is stored.

A description will be made on an example of a snapshot image generation and storage procedure in the present embodiment. At the time of generating a snapshot image, the snapshot unit 163*a* according to the second embodiment causes the second program specified in advance to be transferred from the nonvolatile storage unit 140 to the unexecution area of the main memory unit 150. That is, while the embedded system 100*a* is being started up, the snapshot unit 163*a* causes the second program to be transferred from the nonvolatile storage unit 140 to the unexecution area of the main memory unit 150. Then, the snapshot unit 163*a* generates a snapshot image based on the states of the execution and unexecution areas of the main memory unit 150 and stores the snapshot image into the nonvolatile storage unit 140. That is, the snapshot image includes the first program that is being executed and the second program that is not executed.

Figure 10:
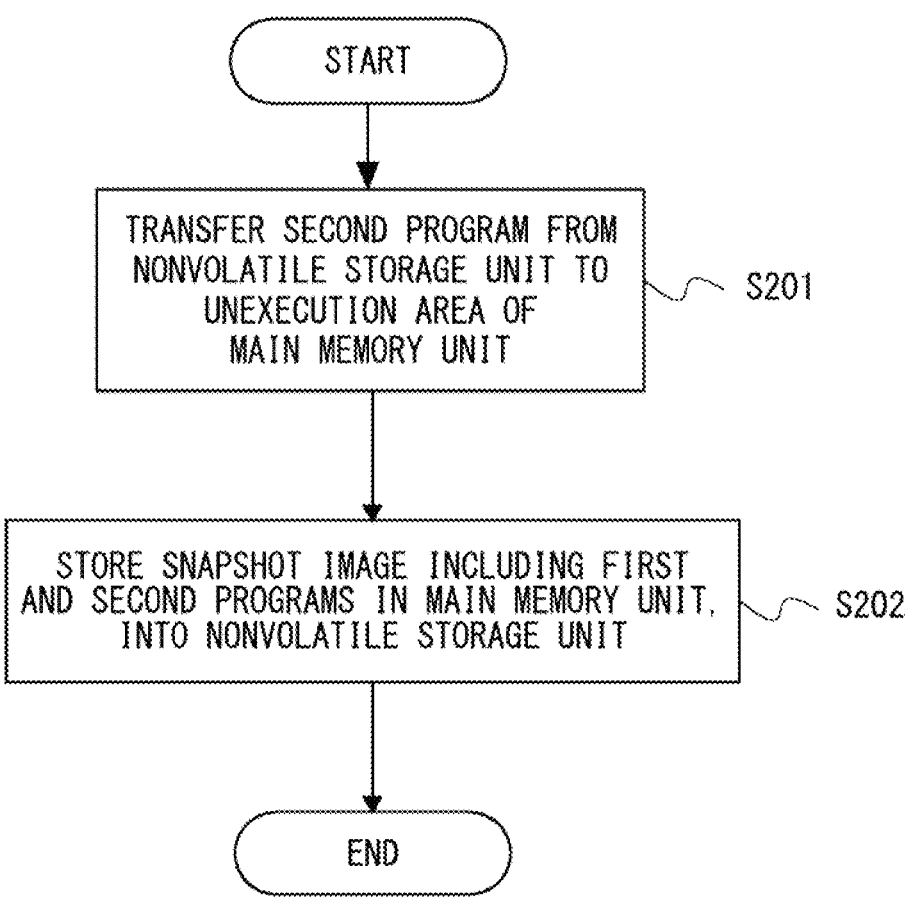
FIG. 10 is a flowchart showing a flow of a snapshot image storage process according to the second embodiment.
Figure 11:
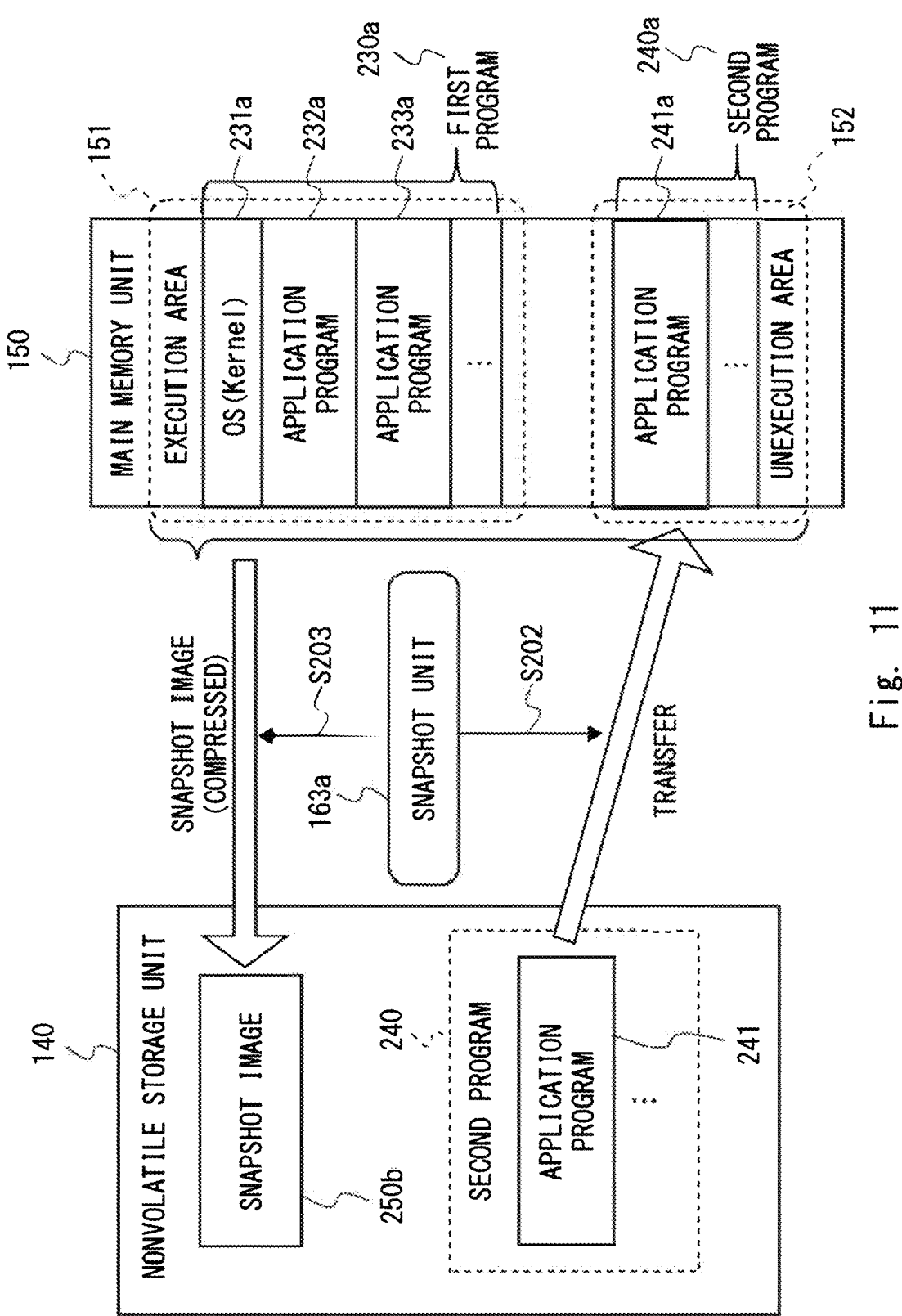
FIG. 11 is a diagram for illustrating a concept of the snapshot image storage process according to the second embodiment.

FIG. 10 is a flowchart showing a flow of a snapshot image storage process according to the second embodiment. Further, FIG. 11 is a diagram for illustrating a concept of the snapshot image storage process according to the second embodiment. The description below will be made, appropriately with reference to FIGS. 10 and 11.

For example, it is assumed that, at the time of developing the embedded system 100*a*, a developer et al. examine a program that is not executed while the first program 230*a* is being executed, from among programs installed in the embedded system 100*a*. For example, while the first program 230*a* is being executed, the developer et al. select the second program 240 that is not loaded in the execution area of the main memory unit 150, as not being executed, using a development terminal or the like.

The snapshot unit 163*a* transfers the second program 240 from the nonvolatile storage unit 140 to the unexecution area of the main memory unit 150 (S201). For example, as shown in FIG. 11, a second program 240*a* that includes an application program 241*a* is transferred to an unexecution area 152 of the main memory unit 150.

After that, the snapshot unit 163*a* stores a snapshot image 250*b* that includes the first program 230*a* and the second program 240*a* in the main memory unit 150, into the nonvolatile storage unit 140 (S202). Here, the snapshot unit 163*a* generates the snapshot image 250*b* that is compressed, for an area that includes an execution area 151 and the unexecution area 152 of the main memory unit 150. The snapshot image 250*b* generated in this way is stored into the nonvolatile storage unit 140 as a snapshot image 250*b* during normal operation. The generation and storage of the snapshot image 250*b* may be arbitrarily performed in a procedure similar or corresponding to the above procedure, at the time of writing in a factory, at the time of major update of programs, or the like. For example, a developer et al. may generate the snapshot image 250*b* and perform writing, that is, storage of the generated snapshot image 250*b* into the nonvolatile storage unit 140 in the embedded system 100*a*, using a development terminal or the like without using the embedded system 100*a*. That is, a computer such as a development terminal generates the snapshot image 250*b* from a state of a main memory unit in which at least the first program 230*a* that is being executed and the second program 240*a* that is not executed are stored. At this time, the main memory unit in which the snapshot image 250*b* is to be generated may be a memory or the like included in the computer such as a development terminal or may be the main memory unit 150 included in the embedded system 100*a*. Then, the computer such as a development terminal may store the generated snapshot image 250*b* into the nonvolatile storage unit 140 of the embedded system 100*a*.

Next, a description will be made on a process at startup during the normal operation of the embedded system 100*a* in which the snapshot image 250*b* is stored. The embedded system 100*a* performs the startup process as in FIGS. 4 and 5 explained above. At step S115, the snapshot image 250*b* transferred from the nonvolatile storage unit 140 to the main memory unit 150 includes the second program 240*a*. Therefore, at step S117, the first startup processing unit 161 can perform falsification verification for the snapshot image 250*b* that includes the first program 230*a* and the second program 240*a*. In other words, at startup of the embedded system 100*a*, the first startup processing unit 161 performs falsification verification for the first program 230*a* and the second program 240*a* included in the snapshot image 250*b* together. Therefore, it is not necessary to additionally perform falsification verification for the second program 240*a*, and the efficiency of falsification verification can be improved.

Then, if it is confirmed by the falsification verification that the snapshot image 250*b* is normal, the second startup processing unit 162 executes the first program 230*a* stored in the execution area 151, which is other than the unexecution area 152, between the programs restored from the snapshot image 250*b* at step S120. That is, if it is confirmed by the falsification verification for the snapshot image 250*b* that the snapshot image 250*b* is normal, the second startup processing unit 162 executes the first program 230*a* restored from the snapshot image 250*b* onto the main memory unit 150. Therefore, at startup, the second program 240*a* is not executed, and it is possible to return to the state of snapshot image acquisition time.

OTHER EMBODIMENTS

An embedded system according to each of the embodiments described above is applicable to a general-purpose information processing apparatus.

The present disclosure has been described based on the above embodiments. It goes without saying, however, that the present disclosure is not limited to the configurations of the above embodiments and includes various kinds of modifications, alterations, and combinations that one skilled in the art could make within the scope of the disclosure of claims of the present application.

Though a hardware configuration has been described in the above embodiments, the present disclosure is not limited thereto. In the present disclosure, an arbitrary process can be realized by causing a CPU to execute a computer program.

In the above example, the program includes a command group (or a software code) for, when being read in a computer, causing the computer to perform one or more of the functions described in the embodiments. The program may be stored in a non-transitory computer-readable medium or a tangible storage medium. The computer-readable medium or the tangible storage medium includes: a RAM, a ROM, a flash memory, solid-state drive (SSD) or other memory technologies; a CD-ROM, a digital versatile disc (DVD), a Blu-ray (registered trademark) disc or other optical disc storages; and a magnetic cassette, a magnetic tape, a magnetic disk storage, or other magnetic storage devices though these are mere examples, and the medium is not limited thereto. The program may be transmitted on a transitory computer-readable medium or a communication medium. The transitory computer-readable medium or the communication medium includes an electrical, optical, or acoustic propagation signal, or propagation signals in other forms though these are mere examples, and the medium is not limited thereto.

By the present disclosure, it is possible to provide an embedded system startup method and startup program for preventing delay in startup time while ensuring program integrity at startup of an embedded system and improving the efficiency of falsification verification processing while ensuring program integrity in the embedded system, and an embedded system.

The present disclosure is applicable to an embedded system and a general-purpose information processing apparatus and has industrial applicability.

What is claimed is:

1. An embedded system startup method, wherein a processor, which is included in an embedded system and comprises a main-memory unit, and a nonvolatile storage unit storing a snapshot image based on a state of the main memory unit during execution of at least a first program, performs falsification verification for the snapshot image at startup, and, if being normal is confirmed by the falsification verification, executes the first program restored on the main memory unit from the snapshot image;

the snapshot image is generated, with an unexecuted second program being further included in the state of the main memory unit; and the falsification verification performed by the processor for the snapshot image at the startup is falsification verification for the first program and the unexecuted second program included in the snapshot image.

2. The embedded system startup method according to claim 1, wherein the processor causes the snapshot image to be transferred from the nonvolatile storage unit to the main memory unit in a state of compressed data in a predetermined format;

the processor performs the falsification verification for the compressed data after being transferred; and if being normal is confirmed by the falsification verification, the processor causes the compressed data to be decompressed on the main memory unit to restore the first program, and causes the first program to transition to an executable state.

3. The embedded system startup method according to claim 1, wherein during a period from start of transfer of the snapshot image from the nonvolatile storage unit to the main memory unit in a state of compressed data in a predetermined format until completion of the transfer, the processor starts decompression of the compressed data on the main memory unit to restore the first program;

the processor performs the falsification verification for the compressed data after being transferred; and if being normal is confirmed by the falsification verification, the processor causes the restored first program to transition to an executable state.

4. A non-transitory computer readable medium storing an embedded system startup program, the embedded system startup program causing an embedded system, which comprises a main memory unit, and a nonvolatile storage unit storing a snapshot image based on a state of the main memory unit during execution of at least a part of a first program, to execute: a process for performing falsification verification for the snapshot image at startup, and a process for, if being normal is confirmed by the falsification verification, executing the first program restored on the main memory unit from the snapshot image;

the snapshot image is generated, with an unexecuted second program being further included in the state of the main memory unit; and the falsification verification performed by the processor for the snapshot image at the startup is falsification verification for the first program and the unexecuted second program included in the snapshot image.

5. An embedded system, comprising: a main memory unit; and a nonvolatile storage unit storing a snapshot image based on a state of the main memory unit during execution of at least a part of a first program, the embedded system performing falsification verification for the snapshot image at startup, and the embedded system executing, if being normal is confirmed by the falsification verification, the first program restored on the main memory unit from the snapshot image;

the snapshot image is generated, with an unexecuted second program being further included in the state of the main memory unit; and the falsification verification performed by the processor for the snapshot image at the startup is falsification verification for the first program and the unexecuted second program included in the snapshot image.

* * * * *